(No Model.) 2 Sheets—Sheet 1.

W. ROTTHOFF & G. K. HAMFELDT.
CAR DUMPING APPARATUS.

No. 583,772. Patented June 1, 1897.

WITNESSES

INVENTORS
William Rotthoff
George K. Hamfeldt
by Bakewell & Bakewell
their attys

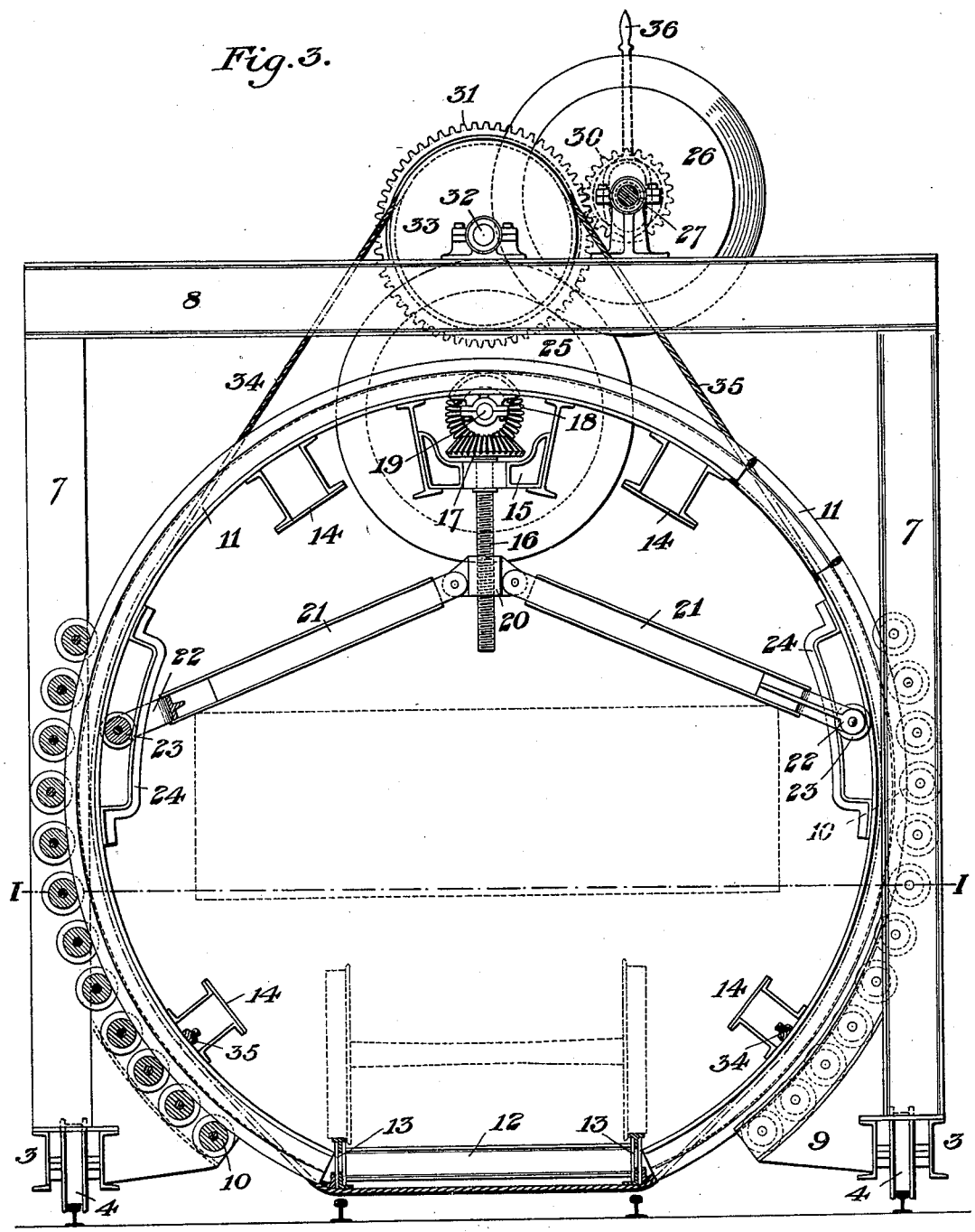

UNITED STATES PATENT OFFICE.

WILLIAM ROTTHOFF AND GEORGE K. HAMFELDT, OF DUQUESNE, PENNSYLVANIA.

CAR-DUMPING APPARATUS.

SPECIFICATION forming part of Letters Patent No. 583,772, dated June 1, 1897.

Application filed April 24, 1896. Serial No. 588,903. (No model.)

*To all whom it may concern:*

Be it known that we, WILLIAM ROTTHOFF and GEORGE K. HAMFELDT, of Duquesne, in the county of Allegheny and State of Pennsylvania, have invented a new and useful Improvement in Car-Dumping Apparatus, of which the following is a full, clear, and exact description, reference being had to the accompanying drawings, forming part of this specification, in which—

Figure 1:
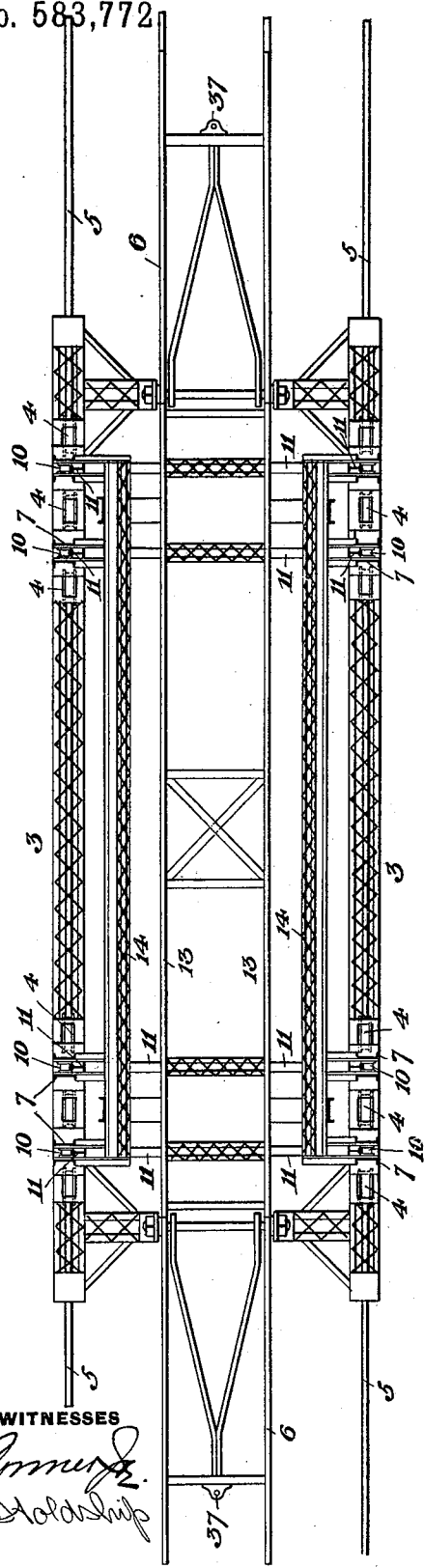
Figure 2:
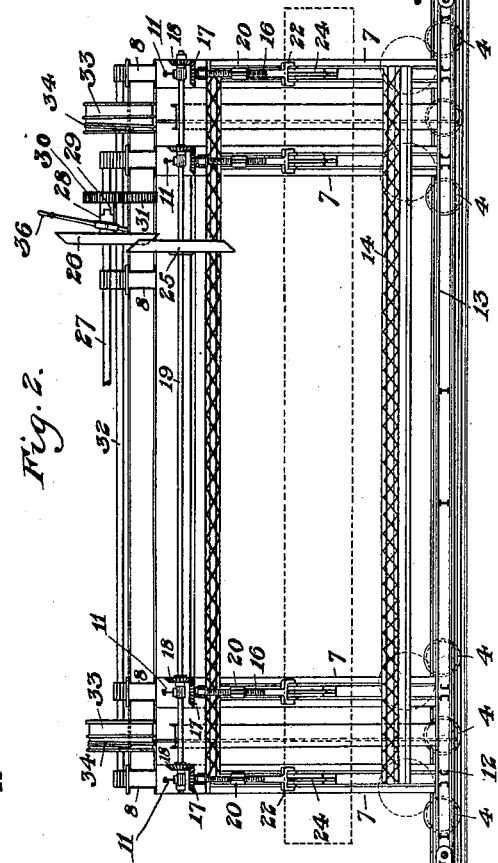

Figure 1 is a horizontal longitudinal section on the line 1 1 of Fig. 3 on a reduced scale. Fig. 2 is a vertical longitudinal section of our improved apparatus, and Fig. 3 is an enlarged cross-section of the same.

Our invention relates to that class of car-dumping apparatus wherein a car is moved into a rotatory cage and clamped therein, the cage being rotated to dump the car; and it consists in an improved apparatus of this general type which may be moved along so as to dump the car at any desired point and in which the car is clamped in place by a simple and effective mechanism, the whole device being constructed and arranged in a very simple and compact apparatus.

In the drawings, in which similar numerals indicate corresponding parts, I show a large carriage or truck having suitable side members 3, within which are journaled wheels 4, which are movable along a track 5. At the center of each of the end members of this truck is pivoted a projecting switch 6, the rails of which are spaced apart to correspond to the standard-gage track, the lower ends of the rails being beveled or tapered so as to allow the wheels of a railway-car to ride up the same. Upon the side members of the truck are mounted four vertical beams or stanchions 7, arranged in pairs near each end of the truck, these vertical beams being formed of separated channels and being connected at their tops by suitable cross-beams 8. Each of the vertical beams is provided at its lower end with an inwardly-projecting cheek-piece 9, and within each of these beams and cheek-pieces is pivoted an arc-shaped series of friction-rollers 10. Supported upon these friction-rollers are four wheels 11, these wheels preferably being formed of rail-sections and being held in position by side flanges upon the friction-rollers. At the lower portion of each wheel is a cross-beam 12, these cross-beams in each wheel connecting longitudinal beams 13 13, upon which are placed the rails upon which the car moves into the cage. This cage is formed by the four wheels above described, these wheels being rigidly joined together by four longitudinal beams 14, which may be formed in any suitable way, as by channels connected by lattice-work, as shown.

Carried in suitable brackets 15 at the upper portion of each wheel of the cage are vertical screw-shafts 16, carrying at their upper ends bevel-wheels 17, intermeshing with bevel-wheels 18, carried upon a longitudinal shaft 19. Carried upon each of these screw-shafts 16 is a screw-threaded collar 20, having side lugs to which are pivoted the oppositely-inclined clamping-bars 21, these clamping-bars being forked at their outer end to form bearings 22 for rollers 23, which are held within yokes 24, secured to the wheel. The shaft 19 is provided with a friction-pulley 25, arranged to contact with a friction-pulley 26 upon a shaft 27, which is driven by a suitable motor carried on the machine. The pulley 26 is carried by a collar 28, which collar is also provided with a crab-clutch 29, arranged to engage a pinion 30, which is loosely mounted upon the shaft. The pinion 30 engages a toothed wheel 31, carried upon a shaft 32, mounted in suitable bearings upon the cross-beams 8, and near each end of this shaft are carried winding-drums 33, to each of which are secured ropes or chains 34 35, these ropes extending around the wheels in opposite directions and being secured to the lower beams 14 by any suitable attachment. The collar which carries the friction-pulley 26 and the clutch is splined to the shaft and actuated by a suitable lever-handle 36 under control of the operator upon the apparatus.

The operation of the device is as follows: The truck having been moved upon its tracks to the point desired by coupling an engine to lugs 37 upon the switches 6, the engine is detached and the loaded car is moved up on the switch onto the track-section within the rotatable cage. The operator then throws the friction-pulleys 25 and 26 into engagement with each other, whereupon the screw-shafts 16, through their nuts 20, move the clamping-bars 21 downwardly until they engage the upper corners of the car-body. As these clamping-bars extend at an angle to the body of the car they serve to clamp the same against either vertical or side motions, thus effecting with a single set of clamps what has formerly required two sets. The operator then moving the collar 28 along the shaft disengages the pulleys 25 and 26 and causes the crab-clutch to engage the pinion 30, which, actuating the toothed wheel 31, causes the rotation of the shaft 32 and a consequent winding of the ropes upon one side of the wheels and an unreeling of the ropes upon the other side, thus rotating the cage and dumping the car, the side to which it is dumped being determined by the direction of rotation of the motor-shaft 27. The engine then being reversed the frame is swung back to its original position, and the crab-clutch being disengaged the friction-pulleys 25 and 26 are thrown into engagement, and the screw-shafts 16 being rotated in the opposite direction the arms 21 are moved upwardly, their rollers 23 moving upon the inner faces of the yokes. The car is then drawn out of the framework, and, passing down one of the swinging switches, the apparatus is ready for another loaded car.

The advantages of our invention will be apparent to those skilled in the art, since the rotatable cage is mounted in a framework which is movable, so that the car may be dumped at any desired point. The motor for clamping the car and rotating the cage is mounted upon and travels with the apparatus, and the clamping mechanism is exceedingly simple and effective. The framework of the apparatus is built up of merchantable shapes and the whole apparatus is simple and not liable to get out of order.

Many changes may be made in the form and arrangement of the parts without departing from our invention.

We claim—

1. In car-dumping apparatus, a rotatable cage and oppositely-inclined clamping-bars carried therein, said bars being arranged to clamp the car against both vertical and lateral movement; substantially as described.

2. In car-dumping apparatus, the combination with a rotatable cage of screw-shafts supported within said cage, threaded collars carried upon said screw-shafts, oppositely-inclined arms arranged in pairs and pivoted to the threaded collars, and means for rotating said screw-shafts; substantially as described.

3. In car-dumping apparatus, a rotatable cage having screw-shafts supported therein, threaded collars movable upon said shafts, oppositely-inclined clamping-arms pivotally connected with said collars, and having rollers at their outer end bearing upon the cage, and means for rotating said screw-shafts; substantially as described.

4. In car-dumping apparatus, a rotatable cage having screw-shafts supported therein, threaded collars movable upon said shafts, oppositely-inclined clamping-arms pivoted to said collars and provided at their outer ends with rollers, and yokes secured to the frame and arranged to hold said rollers in place; substantially as described.

In testimony whereof we have hereunto set our hands.

WILLIAM ROTTHOFF.
GEORGE K. HAMFELDT.

Witnesses:
G. I. HOLDSHIP,
H. M. CORWIN.